No. 729,686. PATENTED JUNE 2, 1903.
S. F. SHORT.
POWER WRENCH.
APPLICATION FILED OCT. 6, 1902.
NO MODEL.
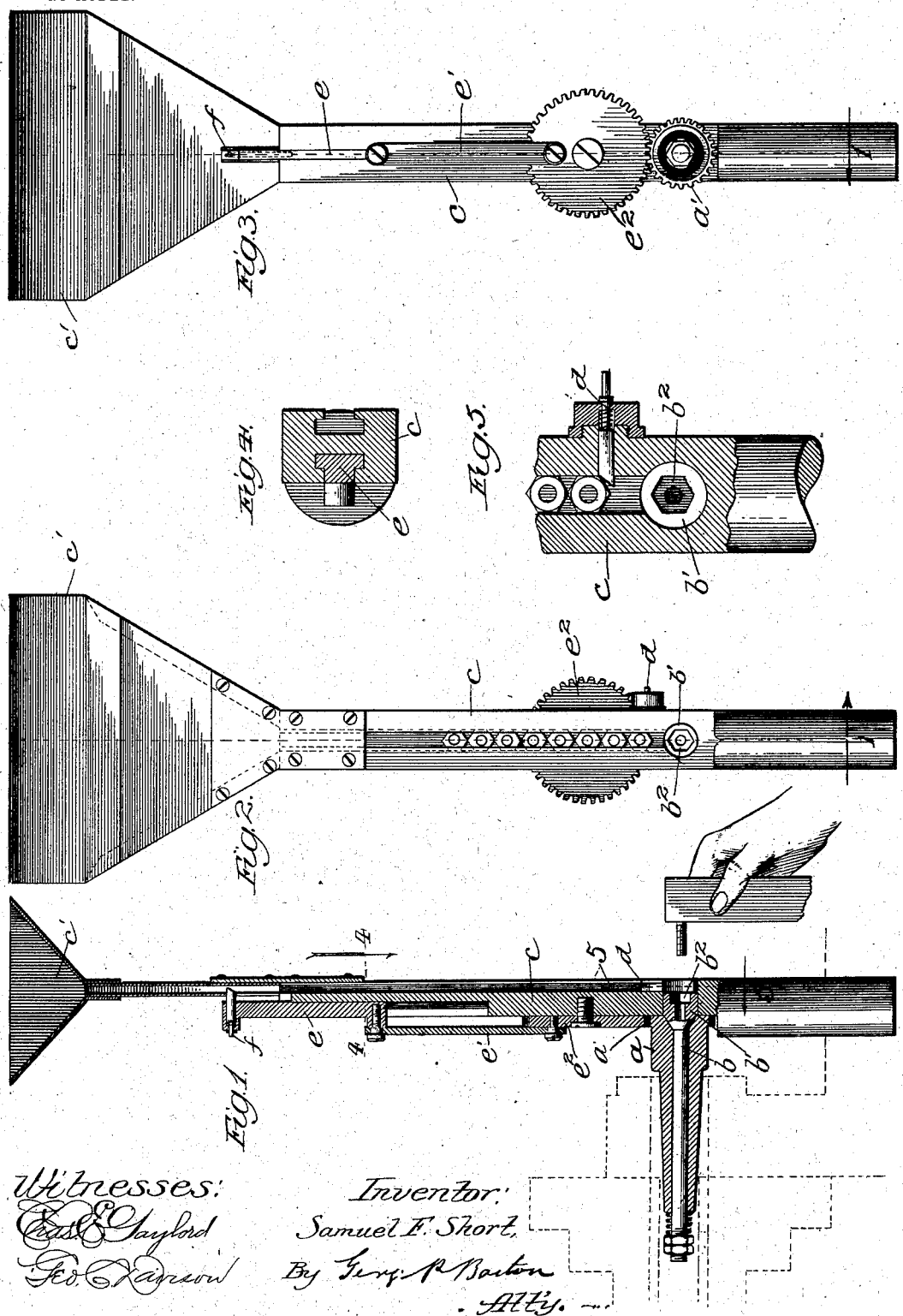
Witnesses:
Inventor:
Samuel F. Short,
By Geo. R. Barton
Att'y.

No. 729,686.

Patented June 2, 1903.

UNITED STATES PATENT OFFICE.

SAMUEL F. SHORT, OF NEW YORK, N. Y., ASSIGNOR TO WESTERN ELECTRIC COMPANY, OF CHICAGO, ILLINOIS, A CORPORATION OF ILLINOIS.

POWER-WRENCH.

SPECIFICATION forming part of Letters Patent No. 729,686, dated June 2, 1903.

Application filed October 6, 1902. Serial No. 126,053. (No model.)

*To all whom it may concern:*

Be it known that I, SAMUEL F. SHORT, a citizen of the United States, residing at New York, in the county of New York and State of New York, have invented a certain new and useful Improvement in Power-Wrenches, of which the following is a full, clear, concise, and exact description.

My invention relates to a power-wrench for quickly assembling nuts upon the threaded shanks of screws—such, for instance, as the binding-screws of electrical apparatus.

In accordance with my invention a wrench, which preferably consists of a chuck and a spindle with a socketed head held frictionally thereby, is arranged to be rotated by suitable driving mechanism, and the nuts are fed into an adjacent guideway, from which they may be engaged by the end of a threaded screw-shank held in the hand of the operator and moved one by one into the rotating wrench-socket, whereby they are rapidly and automatically screwed upon said shank. The advantage of the wrench being held frictionally instead of rigidly by the chuck is that the operator is not required to pull the nut out of the socket at any certain instant, but may wait until it has been screwed on as far as it will go, whereupon the wrench will remain stationary while the chuck continues to rotate, slipping relatively thereto.

I will describe my invention by reference to the accompanying drawings, wherein—

Figure 1 is a vertical sectional view of a machine constructed in accordance therewith. Fig. 2 is a front view thereof. Fig. 3 is a rear view. Fig. 4 is a detail view in cross-section, taken on line 4 4 of Fig. 1; and Fig. 5 is a detail sectional view on line 5 5 of Fig 1.

The same parts are designated by the same letters of reference wherever they are shown.

The head or chuck $a$, which carries the socketed spindle or wrench $b$, is arranged to be driven by any suitable means. For instance, it may be inserted in the head of a lathe, as shown in dotted lines in Fig. 1. The wrench $b$ consists of a spindle passing through the chuck $a$, said spindle having an enlarged head $b'$, which rests in a conical seat in the forward end of the chuck and having its rear end passing through the end of the chuck and fitted with an adjusting-nut and a lock-nut, a compression-spring being confined between the adjusting-nut and the end of the chuck-spindle. The wrench-spindle is thus held frictionally by the chuck, so that it can slip relatively thereto. The enlarged head of the spindle $b$ is provided with a nut-shaped recess $b^2$, as shown, to constitute a wrench.

A chute or guideway $c$ is provided in association with the friction-wrench, having a hopper $c'$ at the top to receive the nuts and a yielding stop $d$ near the bottom just above the wrench to hold the column of nuts contained in the chute.

An agitator is preferably provided in connection with the hopper, so that the nuts may be shaken about in said hopper until they fall edgewise into the chute, in which they rest in a vertical column edge to edge. I have shown a vertically-reciprocating slide $e$, provided with a spring-actuated pawl $f$ at its upper end entering the lower portion of the hopper. The slide $e$ is connected by a pitman $e'$ with a gear-wheel $e^2$, which meshes with a driving gear-wheel $a'$, formed upon or carried by the rotating head $a$. As the head rotates it drives the gear-wheel $e^2$, which in turn causes the slide $e$ to be reciprocated, moving the pawl $f$ up and down within the hopper. The pawl has a rounded end, so that in going down it will slip over the nuts, which may be held in the chute instead of jamming in case the chute is full. The office of the pawl is simply to agitate the nuts in the hopper above it, so that they will be entered into the chute.

When the machine is set in operation and a handful of nuts is thrown into the hopper, these are fed down into the chute and rest in a column edge to edge upon the yielding stop $d$ at the bottom. The front of the chute has a vertical slot through which the stem of a screw (as a binding-screw mounted on the base of an electrical instrument) held in the hand of the operator may be inserted to engage the eye of the nut nearest to the wrench. The operator presents the point of the screw to the eye of the nut and forces it past the yielding stop and on into the socket of the rotating wrench-head $b'$, whereby the nut is rapidly and automatically screwed on. The operator may, if desired, wait until the nut has been screwed on as far as it will go before pulling it out from the socket, in which case the wrench will slide frictionally within the chuck when the nut can be screwed on no farther.

I claim—

1. The combination with a rotatable chuck and means for driving the same, of a wrench held frictionally by said chuck and a guideway for nuts leading to the mouth of said wrench, an opening being provided in the front of said guideway through which the stem of a screw may be inserted to engage the eye of a nut and move the same into the mouth of the wrench.

2. The combination with a driven rotating wrench, of a nut-guideway leading to the mouth of said wrench, adapted to hold nuts in a column edge to edge, a hopper at the upper end of the chute for receiving the nuts, an agitator and mechanism for reciprocating the same within the hopper, an opening being provided in the front of the nut-guideway through which the stem of a screw may be inserted, to engage the eye of a nut and move the same into the rotating wrench.

3. The combination with a rotatable chuck and means for driving the same, of a wrench held frictionally by said chuck and rotated thereby, whereby a nut held in the chuck will be automatically screwed upon a threaded shank presented at the eye of said nut, the wrench slipping relatively to the chuck when the nut can be screwed on no farther.

In witness whereof I hereunto subscribe my name this 17th day of March, A. D. 1902.

SAMUEL F. SHORT.

Witnesses:
F. A. HOPTON,
C. CAMPBELL.